United States Patent [19]

Liang et al.

[11] 4,127,708

[45] Nov. 28, 1978

[54] SOLID STATE CELL WITH HALOGEN-CHALCOGEN-METAL SOLID CATHODE

[75] Inventors: Charles C. Liang, Andover; Ashok V. Joshi, Burlington; Luverne H. Barnette, Medford, all of Mass.

[73] Assignee: P. R. Mallory & Co. Inc., Indianapolis, Ind.

[21] Appl. No.: 821,885

[22] Filed: Aug. 5, 1977

[51] Int. Cl.$^2$ ............................................. H01M 6/18
[52] U.S. Cl. .................................... 429/191; 429/218
[58] Field of Search ........................ 429/191, 218, 194

[56] References Cited

U.S. PATENT DOCUMENTS

| | | | |
|---|---|---|---|
| 3,730,775 | 5/1973 | Liang | 429/218 |
| 3,791,867 | 2/1974 | Broadhead et al. | 429/218 |
| 3,988,164 | 10/1976 | Liang et al. | 429/191 |
| 4,049,887 | 9/1977 | Whittingham | 429/194 |

OTHER PUBLICATIONS

Shtilikha et al., Growing Bismuth Oxyhalide Single Crystals by Chemical Gas-Transport Reactions, Cem. Abstr., vol. 75, 1971, 133796j.

Primary Examiner—Donald L. Walton
Attorney, Agent, or Firm—Ronald S. Cornell; Israel Nissenbaum; Charles W. Hoffmann

[57] ABSTRACT

A solid state electrochemical cell containing a cathode comprising a compound which is solid at ambient temperatures and which contains a halogen atom, a chalcogen atom and an atom of a third element, with the chalcogen and halogen not in a redical grouping.

16 Claims, No Drawings

SOLID STATE CELL WITH HALOGEN-CHALCOGEN-METAL SOLID CATHODE

This invention relates to novel cathode materials for solid state cells, and more particularly it relates to novel cathode materials for high energy density, solid state cells.

With the increased sophistication of components in electronic devices, such as the recent progression from transistors to miniature integrated circuits, the operating power demands of these devices have been drastically reduced. Thus, some devices such as pacemakers no longer operate at drain rates measured in milliamperes but rather they operate at drain rates measured in microamperes. As a direct result thereof, solid state electrochemical cells with high voltages and high energy density but generally capable of operating only in the microampere drain region have become of increasingly greater importance. This is especially true because of their extremely important ability to remain stable. Solid state cells have shelf lives in excess of 10 years and are not subject to detrimental gassing and leakage such as can be found in solution cells. Additionally, they are stably operable under widely varying temperature conditions.

Low energy density solid state cells such as the Ag/RbAg$_4$I$_5$/RbI$_3$ cells of the prior art, while capable of delivering energy at a discharge rate of 40 milliamps at room temperature have an energy density of less than 1 Whr/in$^3$, and discharge at a low voltage of about 0.6 volts. Devices such as pacemakers having such batteries will require frequent complicated replacement. Cells have been developed which can provide a voltage in excess of 1.5 volts and which have energy densities ranging up to about 10 Whr/in$^3$ for effective long term operation under low drain rate applications. These cells generally employ lithium metal anodes, lithium halide electrolytes (most notably lithium iodide) and cathodes of heavy metal halides (particularly iodides), sulfides, or iodine itself.

It is an object of the present invention to provide solid cathode materials of high energy density which are particularly useful for long life, high energy density, solid state cell systems. A further object of the invention is to provide solid cathode materials which are useful for extended life low energy density high drain rate solid state cells.

The materials used in the cathodes of the present invention have as their basis, compounds having at least one atom from the chalcogen family (Group VIA of the Periodic Table) which includes oxygen, sulfur, selenium and tellurium and at least one atom from the halogen family (Group VIIA of the Periodic Table) i.e., fluorine, chlorine, bromine and iodine and which will be referred to herein as "halo-chalcogenides." Since the above cathode materials are components in solid state cells the compounds must be solid at room (or ambient) temperature. Additionally, the halogen and chalcogen should be identifiable as separate entities within the compound and not as combined radical groupings such as chlorates, bromates or iodates. The halogen and chalcogen are combined in a compound with a third element, usually a metal such as bismuth or molybdenum or a nonmetal such as phosphorus.

The preferred chalcogen is oxygen and the preferred halogen is iodine. Accordingly, oxide iodides such as bismuth oxide iodide are most preferred.

Other iodo-chalcogenides include BiTeI, BiSI, BiSeI, and SbSI.

Examples of oxide halides, other than oxide-iodides, include AsOCl, BiOBr, BiOCl, BiOF, MoO$_2$Br$_2$, MoOCl$_3$, MoO$_2$Cl$_2$, MoOCl$_4$, MoOF$_4$, MoO$_2$F$_2$, NbOBr$_3$, NbOCl$_3$, POBr$_3$, P$_4$O$_4$Cl$_{10}$, Sb$_4$O$_5$Cl$_2$, SbOCl, and SeOBr$_2$.

These solid halo-chalcogenides, while useful with generally any conventional anode material, are particularly useful in long lifetime applications which require greater energy density using cells having anodes selected from Groups IA and IIA of the Periodic Table and other metals above hydrogen in the EMF scale. Of particular interest is the lithium anode which, because of its light weight and high voltage, provides the greatest energy density.

Electrolytes used in high energy density solid state cell are generally composed of alkali metal salts and particularly alkali metal halides, with the preferred electrolyte in solid state cells being lithium iodide because of its relatively high ionic conductivity and low electronic conductivity. The conductivity of lithium iodide electrolytes have been improved by the addition of aluminum oxide (Al$_2$O$_3$) and lithium hydroxide (LiOH) as more fully set forth in U.S. Pat. No. 3,713,897 and this electrolyte is therefore presently preferred.

The following examples clearly show the beneficial effects of the novel solid cathode materials of the present invention. The examples are set forth primarily for illustrative purposes and any specifics contained therein should not be considered as limitations on the inventive concept. All parts in the examples, as throughout the specification and claims, are parts by weight unless otherwise indicated.

EXAMPLE 1

A solid state cell is made with a lithium metal disc having a contact surface area of about 2 cm$^2$; and a thickness of 0.01 cm; a solid electrolyte disc with a surface area on each side of about 2.38 cm$^2$ and consisting of LiI, LiOH and Al$_2$O$_3$ (LLA) in a 4:1:2 ratio; and a cathode disc weighing 200 mg, comprising 60% BiOI and 40% bismuth as conductive material and having a surface in contact with said electrolyte of about 2.38 cm$^2$. The cell is constructed as a cathode limited cell, as follows. The electrolyte is pressed first with the cathode at a pressure of about 100,000 psi. Thereafter, the anode is pressed to the opposite side of the electrolyte using a pressure of about 50,000 psi. The cell, when discharged at 37° C. under a load of 200 k$\Omega$, started discharging at 2 volts and after 2400 hours is still discharging at 1.4 volts.

EXAMPLE 2

Several solid state cells are made in accordance with the procedures of Example 1 but with the cathodes comprising 33% BiOI, 33% LLA and 33% bismuth with the latter two components added for conductivity purposes. Three cells are discharged at 110° C. under loads of 1) 7.5 k$\Omega$ 2) 10 k$\Omega$ and 3) 5 k$\Omega$ with the following results in terms of cell capacity. (Initial voltage for all three cells is 2.4 V.)

| cell | load | mAhrs to 2.0 V | 1.5 V | 1.0 V |
|---|---|---|---|---|
| 1 | 7.5 kΩ | 12.5 | 20 | v21.5 |
| 2 | 10 kΩ | 13.5 | 19.5 | v21.5 |
| 3 | 5.5 kΩ | 11.5 | 18 | v20 |

EXAMPLE 3

A solid state cell is made in accordance with the procedure of Example 1 but with the cathode and electrolyte having surface areas of 2.25 cm$^2$ and the cathode comprises 60% BiOI and 40% bismuth. The cell is discharged at 110° C. under a load of 10 kΩ. After reaching 2.0 volts from a initial voltage of about 2.2 volts the cell output is about 3 mAhr. The cell has a capacity output of about 38 mAhrs to 1.5 volts and about 45 mAhr to 1 volt.

EXAMPLE 4

A cell is made in accordance with the procedure as in Example 1 but with a cathode comprising 90% BiOI and 10% of an 80:20 mixture of TiS$_2$ and S. The cell is discharged at 37° C. (normal body temperature) under a load of 200kΩ. The initial voltage of the cell is about 2.3 volts and the cell is still discharging at about 1.9 volts after 2400 hours.

EXAMPLE 5

Several cells are made in accordance with the procedure as in Example 4 but with a surface area of cathode and electrolyte of about 2.25 cm$^2$. Three cells are discharged at 110° C. under loads of 1) 5 kΩ2) 8 kΩ and 3) 10kΩ respectively, with the following results in terms of cell capacity:

| cell no. | load | initial voltage | mAhr to 2.0 volts | to 1.5 volts |
|---|---|---|---|---|
| 1 | 5kΩ | 2.5 | 18 | 53 |
| 2 | 8kΩ | 2.6 | 33 | 54 |
| 3 | 10kΩ | 2.6 | 34 | 55 |

The foregoing examples are illustrative of the invention. It is understood that various cell constructions as well as changes in component ratios and compositions can be made without departing from the scope of the present invention as defined in the following claims.

What is claimed is:

1. A solid state electrochemical cell comprising a solid anode, a solid electrolyte and a cathode comprising a compound which is solid at ambient temperatures and which contains at least one halogen atom, at least one chalcogen atom, and at least one atom of a third element selected from the group consisting of As, Bi, Mo, Nb, P, Sb, and Se and wherein said halogen and said chalcogen are separately identifiable in a state other than a radical grouping.

2. A solid state cell as in claim 1 wherein said cathode further includes conductive materials.

3. A solid state cell as in claim 1 wherein said halogen is iodine.

4. A solid state cell as in claim 1 wherein said chalcogen is oxygen.

5. A solid state cell as in claim 1 wherein said anode is a metal above hydrogen in the EMF scale.

6. A solid state cell as in claim 5 wherein said anode is lithium.

7. A solid state cell as in claim 6 wherein said solid electrolyte includes an alkali metal salt.

8. A solid state cell as in claim 7 wherein said alkali metal salt is lithium iodide.

9. A solid state electrochemical cell comprising a solid anode, a solid electrolyte and a cathode comprising a bismuth oxide halide.

10. A solid state cell as in claim 9 wherein said solid anode is comprised of lithium.

11. A solid state cell as in claim 10 wherein said solid electrolyte is comprised of an alkali metal salt.

12. A solid state electrochemical cell comprising a solid anode, a solid electrolyte and a cathode comprising bismuth oxide iodide.

13. A solid state electrochemical cell comprising a solid anode comprised of lithium, a solid electrolyte including lithium iodide and a solid cathode comprised of bismuth oxide halide.

14. A solid state cell as in claim 13 wherein said compound is bismuth oxide iodide.

15. A solid state cell as in claim 14 wherein said cathode further includes a conductive material selected from the group consisting of bismuth, titanium disulfide, said solid electrolyte and mixtures thereof.

16. A solid state electrochemical cell comprising a solid anode, a solid electrolyte and a cathode comprising a compound selected from the group consisting of AsOCl, BiOBr, BiOCl, BiOF, BiOI, BiSI, BiSeI, BiTeI, MoO$_2$Br$_2$, MoOCl$_3$, MoO$_2$Cl$_2$, MoOCl$_4$, MoOF$_4$, MoO$_2$F$_2$, NbOBr$_3$, NbOCl$_3$, POBr$_3$, P$_4$O$_4$Cl$_{10}$, Sb$_4$O$_5$Cl$_2$, SbOCl, SbSI, and SeOBr$_2$.

* * * * *